(12) United States Patent  (10) Patent No.: US 8,546,008 B2
Lai  (45) Date of Patent: Oct. 1, 2013

(54) ELECTRONIC DEVICE FACILITATING LOADING OR UNLOADING OF BATTERY THROUGH LATCHING MODULE

(75) Inventor: Chien-Hua Lai, Taipei (TW)

(73) Assignee: Inventec Corporation, Taipei (TW)

( * ) Notice: Subject to any disclaimer, the term of this patent is extended or adjusted under 35 U.S.C. 154(b) by 311 days.

(21) Appl. No.: 12/980,301

(22) Filed: Dec. 28, 2010

(65) Prior Publication Data

US 2012/0135287 A1    May 31, 2012

(30) Foreign Application Priority Data

Nov. 26, 2010  (CN) .................. 2010 2 0638222 U (51) Int. Cl.
    *H01M 2/10*    (2006.01)
(52) U.S. Cl.
    USPC ............................... 429/96; 429/97; 429/100
(58) Field of Classification Search
    USPC .................. 429/96, 97, 100, 99; 361/679.01, 361/679.58, 679.57; 206/703; 396/539
    See application file for complete search history.

(56) References Cited

U.S. PATENT DOCUMENTS

2012/0214052 A1*  8/2012  Hara et al. .................... 429/179

* cited by examiner

*Primary Examiner* — Raymond Alejandro
(74) *Attorney, Agent, or Firm* — CKC & Partners Co., Ltd.

(57) ABSTRACT

Provided is an electronic device, comprising: a casing, comprising an accommodation space that a battery is detachably assembled therein. The battery comprises a hook extending towards the casing, a first and a second urging surfaces that a step connected there between; and a latching module, disposed in the casing and moving back and forth between a first and a second positions. When the latching module moves from the first position towards the second position, the hook, the first urging surface, the step, and the second urging surface are sequentially located in a moving path of a urging portion of the latching module. When the latching module is located at the first position, the urging portion is buckled to the hook. When the latching module is located at the second position, the urging portion is limited by the step and rests on the second urging surface.

8 Claims, 6 Drawing Sheets

FIG. 5

ELECTRONIC DEVICE FACILITATING LOADING OR UNLOADING OF BATTERY THROUGH LATCHING MODULE

CROSS-REFERENCE TO RELATED APPLICATION

This application claims the priority benefit of China application serial no. 201020638222.3, filed on Nov. 26, 2010. The entirety of the above-mentioned patent application is hereby incorporated by reference herein and made a part of specification.

BACKGROUND OF THE INVENTION

1. Field of the Invention

The present invention generally relates to an electronic device, in particular, to an electronic device with a battery loaded or unloaded through a latching module.

2. Description of Related Art

Currently, when a battery of a notebook computer needs to be loaded or unloaded, several latching structures are generally required to achieve the purpose. For example, the latching structure of the notebook computer generally includes a buckling module for buckling the battery and an urging module for pushing the battery out of a case. During the implementation, a user controls the buckling module and the urging module at the same time by two hands respectively, so as to successfully load the battery inside the case or unload the battery from the case. Therefore, not only the manufacturing cost is increased, but also great inconvenience is caused to the user.

SUMMARY OF THE INVENTION

Accordingly, the present invention is directed to an electronic device, which facilitates a user to load or unload a battery through a latching module.

The present invention provides an electronic device, which includes a casing, a battery, and a latching module. The casing has an accommodation space. The battery is detachably assembled in the accommodation space. The battery has a hook extending towards the casing, a first urging surface, a second urging surface, and a step connected between the first urging surface and the second urging surface. The latching module is disposed in the casing and moves back and forth between a first position and a second position. The latching module includes a main body and an urging portion. The urging portion extends from the main body towards the battery, and when the latching module moves from the first position towards the second position, the hook, the first urging surface, the step, and the second urging surface are sequentially located in a moving path of the urging portion. When the latching module is located at the first position, the urging portion is buckled to the hook. When the latching module is located at the second position, the urging portion is limited by the step and rests on the second urging surface.

In an embodiment of the present invention, the first urging surface forms an acute angle with the moving path of the urging portion.

In an embodiment of the present invention, the second urging surface is in parallel with the moving path of the urging portion.

In an embodiment of the present invention, the casing has a first stopping portion located in the casing, the latching module has a second stopping portion, and the first stopping portion is located in a moving path of the second stopping portion.

In an embodiment of the present invention, the latching module further includes an elastic member, disposed in the casing. The elastic member is connected between the main body and the casing, the latching module moves from the second position towards the first position through the elastic member, and the first stopping portion stops the second stopping portion at a third position. The third position is between the first position and the second position.

In an embodiment of the present invention, the third position is at a midpoint between the first position and the second position.

In an embodiment of the present invention, the hook has a third urging surface and a buckling surface. When the latching module is located at the third position, the urging portion substantially rests on the second urging surface, and when the latching module is located between the first position and the third position, the urging portion substantially rests on the buckling surface.

In an embodiment of the present invention, the third urging surface forms an acute angle with the moving path of the urging portion, and the buckling surface is in parallel with the moving path of the urging portion.

In an embodiment of the present invention, the second stopping portion has an elastic arm extending from the main body and a protrusion connected to the elastic arm and facing the first stopping portion.

In an embodiment of the present invention, the electronic device further includes a handle, movably disposed on an outer surface of the casing. The handle has an embedded portion, penetrating the casing, protruding from an inner surface of the casing, and embedded in the main body.

In view of the above, according to the embodiments of the present invention, through the structural cooperation between the latching module and the casing, and since the battery has the hook, the first urging surface, the step, and the second urging surface sequentially located in the moving path of the urging portion of the latching module, the user is enabled to conveniently push the latching module to move from the first position to the second position, so as to urge the battery away from the casing and detach the same, and the latching module is locked to the second position through the step. In this manner, the user may apply a small force to make the battery buckled to the outer surface of the casing, and the electronic device can be operated conveniently by using a few components.

In order to make the above features and advantages of the present invention comprehensible, embodiments are described in detail below with the accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present embodiments of the invention, examples of which are illustrated in the accompanying drawings. Wherever possible, the same reference numbers are used in the drawings and the description to refer to the same or like parts.

Figure 1A:
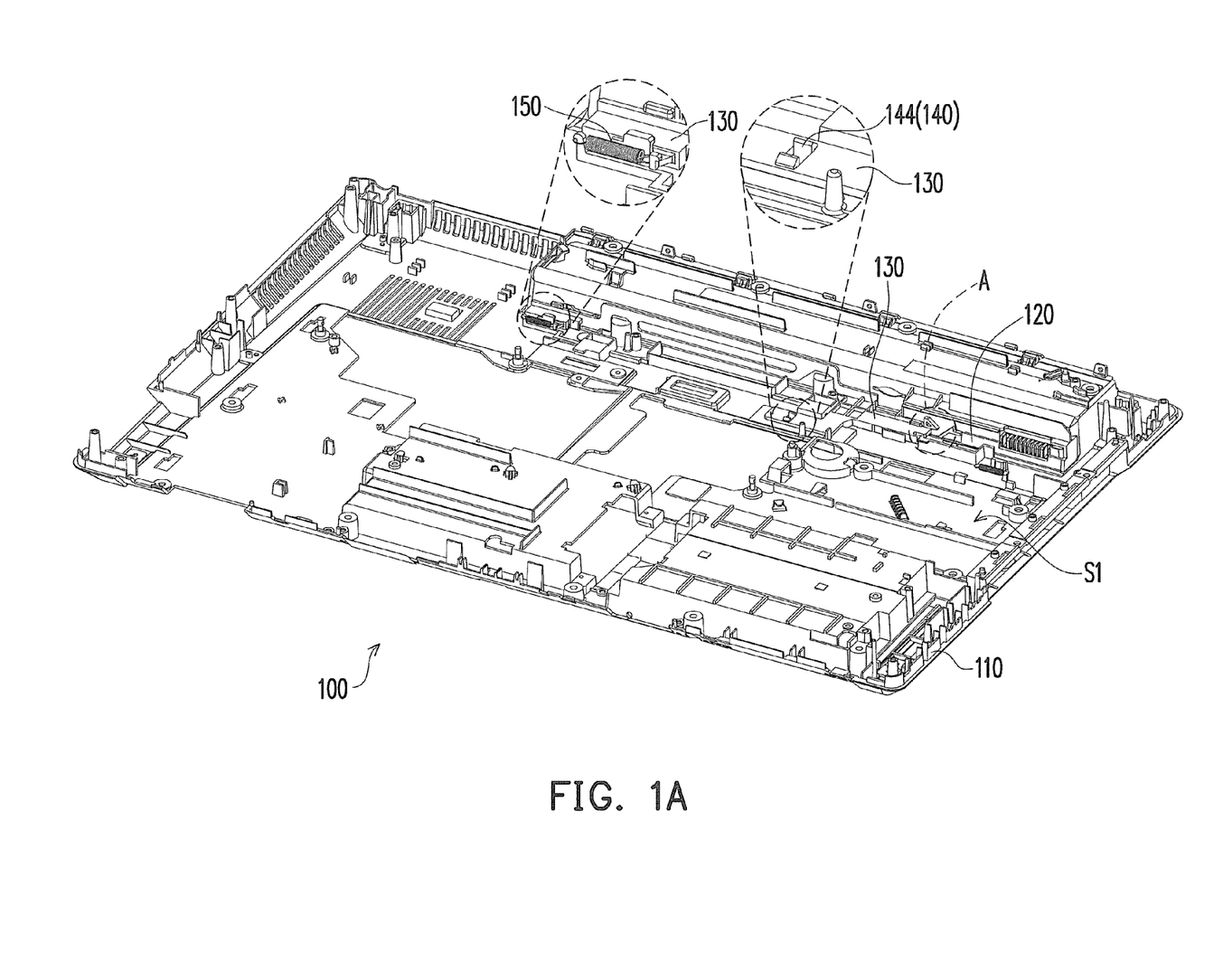
FIG. 1A is a schematic view of an electronic device according to an embodiment of the present invention.
Figure 1B:
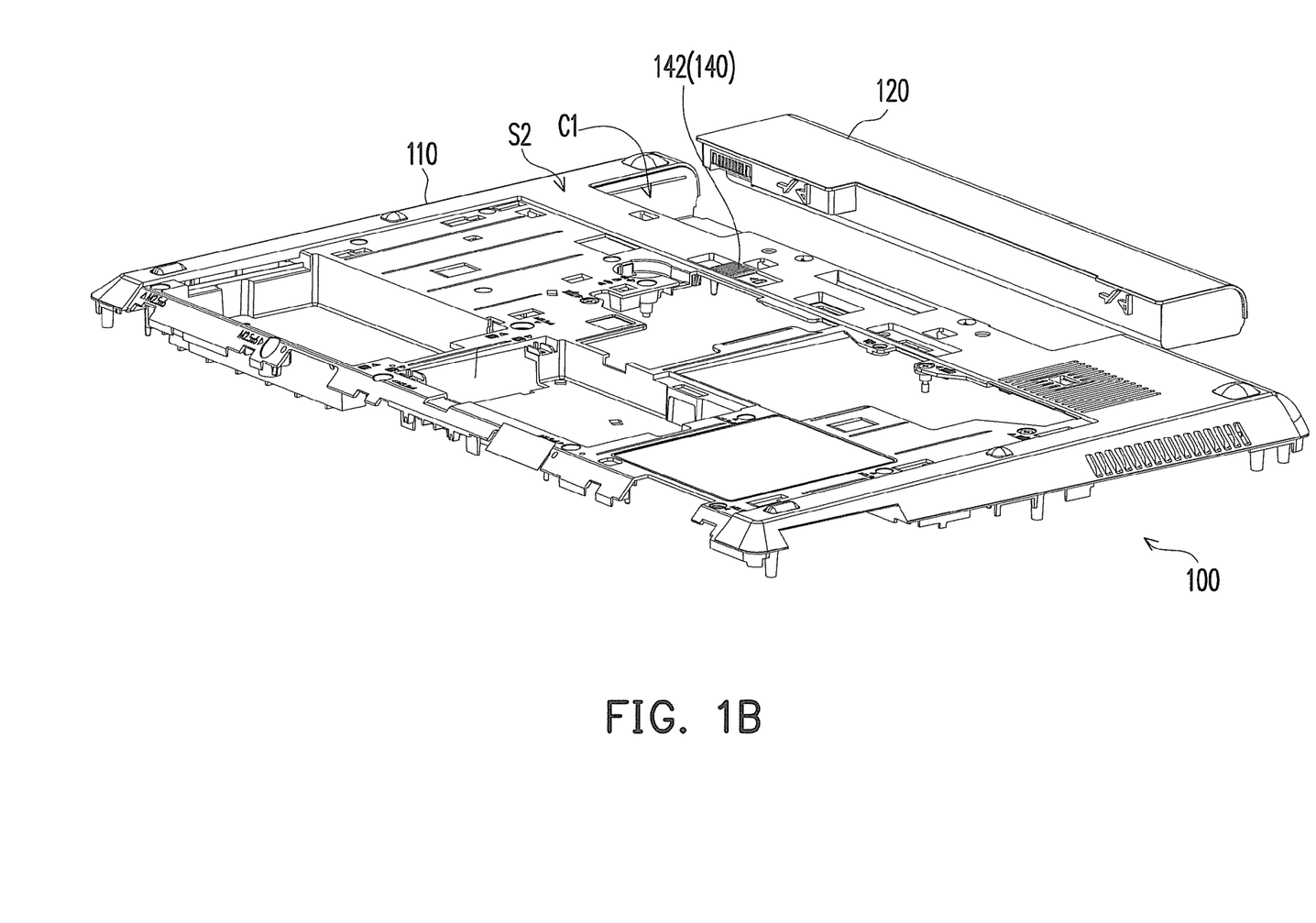
FIG. 1B is a schematic assembled view of a casing and a battery of the electronic device in FIG. 1A.
Figure 2:
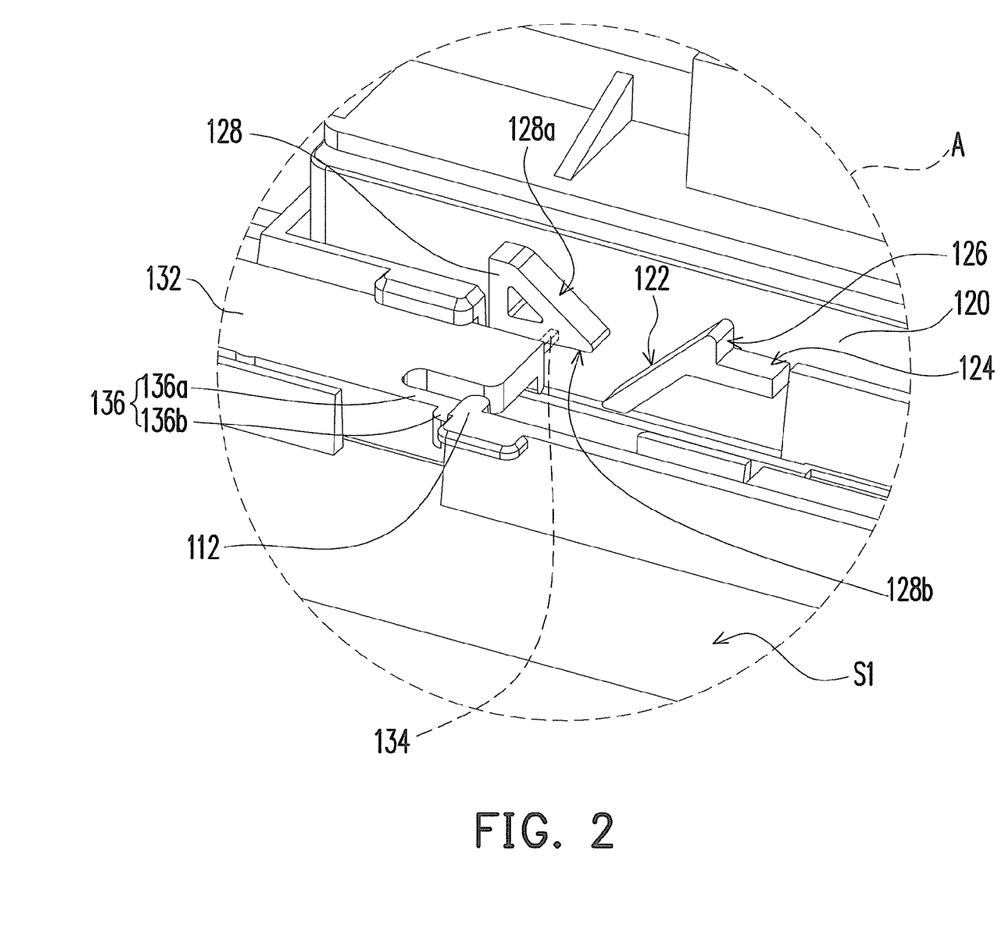
FIG. 2 is a partial enlarged view of a portion A of the electronic device in FIG. 1A.

FIG. 1A is a schematic view of an electronic device according to an embodiment of the present invention. FIG. 1B is a schematic assembled view of a casing and a battery of the electronic device in FIG. 1A. FIG. 2 is a partial enlarged view of a portion A of the electronic device in FIG. 1A. Referring to FIG. 1A, FIG. 1B, and FIG. 2, in this embodiment, the electronic device 100 is, for example, a notebook computer, and a part of the components are shown here to clearly illustrate the disposing relation between the casing and the latching module. The electronic device 100 includes a casing 110, a battery 120, and a latching module 130. The casing 110 has an accommodation space C1, a first stopping portion 112, and an inner surface S1 and an outer surface S2 opposite to each other. The first stopping portion 112 is located on the inner surface S1, and the accommodation space C1 is a battery accommodation slot, located on the outer surface of the casing. The battery 120 is detachably assembled in the accommodation space C1 of the outer surface S2. When the battery 120 is assembled in the accommodation space C1, a first urging surface 122 of the battery 120 penetrates the casing 110 and protrudes from the inner surface S1 of the casing 110. The latching module 130 is disposed on the inner surface S1 of the casing 110.

The electronic device 100 further includes a handle 140 and an elastic member 150. The handle 140 includes a pushing portion 142 and an embedded portion 144. The pushing portion 142 is movably disposed on the outer surface S2 of the casing 110. The embedded portion 144 extends from the pushing portion 142 towards the inner side of the casing 110, protrudes from the inner surface S1 of the casing 110, and is embedded into the latching module 130. Thereby, the user is enabled to drive the pushing portion 142 from the outer surface S2 of the casing 110 to propel the latching module 130 in the casing 110 to load or unload the battery 120.

Figure 3A:
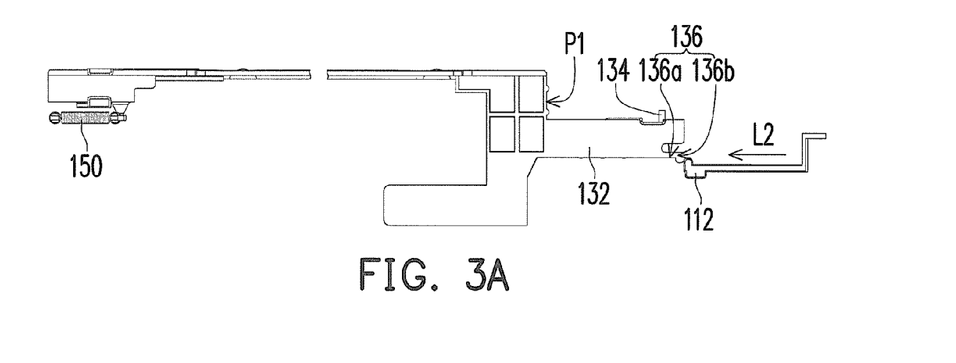
FIG. 3A to FIG. 3C are respectively partial enlarged views of a latching module of the electronic device in FIG. 1A in different moving states.
Figure 3B:
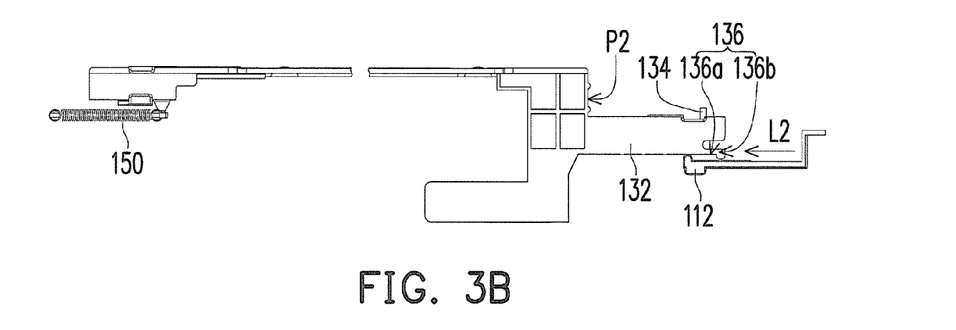
Figure 3C:
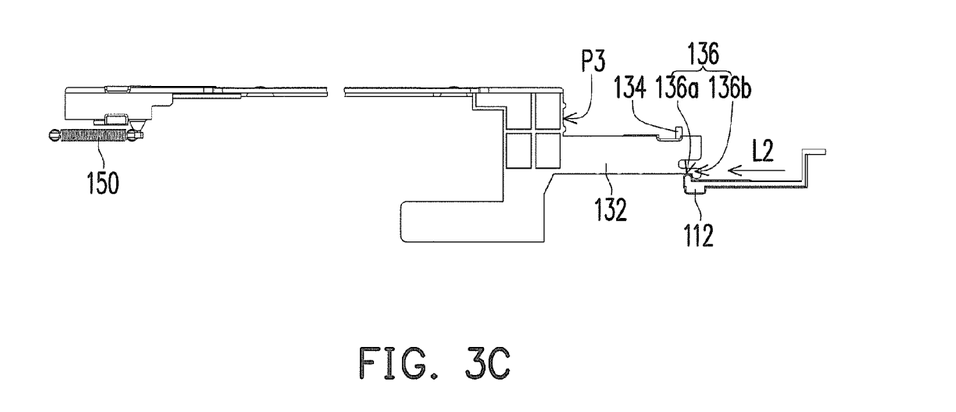

FIG. 3A to FIG. 3C are respectively partial enlarged views of the latching module of the electronic device in FIG. 1A in different moving states. Referring to FIG. 2 and FIG. 3A to FIG. 3C, the user drives the latching module 130 to move back and forth between a first position P1 and a second position P2 through the handle 140. When the user pushes the latching module 130 to move from the first position P1 to the second position P2, the latching module 130 stretches the elastic member 150 at the same time, and when the latching module 130 moves to the second position P2 and the user releases the force applied on the handle 140, the elastic member 150 exerts an elastic force to drive the latching module 130 to move from the second position P2 towards the first position P1.

Figure 4A:
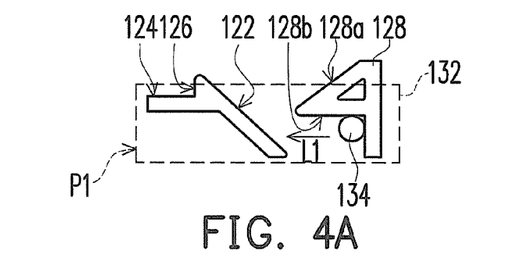
FIG. 4A to FIG. 4E are respectively schematic views of movements between the latching module and the battery of the electronic device in FIG. 1A.
Figure 4B:
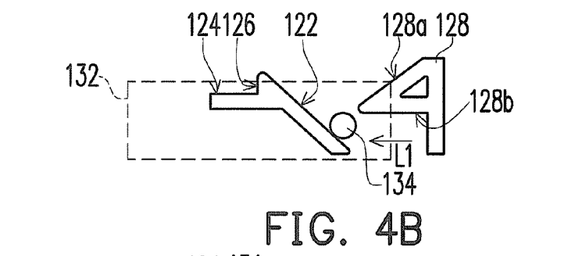
Figure 4C:
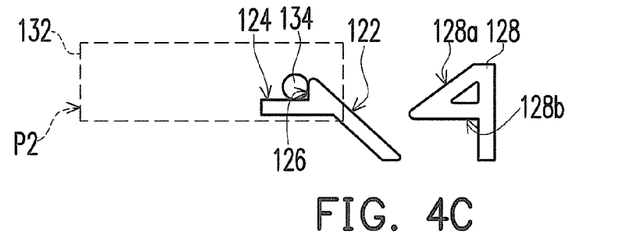

FIG. 4A to FIG. 4E are respectively schematic views of movements between the latching module and the battery of the electronic device in FIG. 1A. FIG. 5 is a partial enlarged view of the electronic device in FIG. 4C at another viewing angle. Referring to FIG. 3A to FIG. 3C, FIG. 4A to FIG. 4C, and FIG. 5, the moving relation between the latching module 130 and the battery 120 is illustrated by contrast. Specifically, the latching module 130 includes a main body 132, an urging portion 134, and a second stopping portion 136. The embedded portion 144 of the handle 140 (shown in FIG. 1A) is embedded in the main body 132 of the latching module 130 to directly control the latching module 130 to move back and forth. The urging portion 134 extends from the main body 132 towards the battery 120. The urging portion 134 and the second stopping portion 136 are respectively located on two opposite sides of the main body 132, and are respectively corresponding to the first urging surface 122 of the battery 120 and the first stopping portion 112 of the casing 110.

It should be noted that, the first urging surface 122 of the battery 120 is located in a moving path L1 of the urging portion 134, and the first urging surface 122 forms an acute angle with the moving path L1 of the urging portion 134. In other words, compared with the moving path L1 of the urging portion 134, the first urging surface 122 is substantially a bevel surface, and thus the urging portion 134, after moving to interfere with the first urging surface 122, applies a force along the bevel surface to the battery 120 so as to urge the battery 120 away from the casing 110. The battery 120 further has a second urging surface 124, located beside the first urging surface 122 and in the moving path L1 of the urging portion 134 from the first position P1 towards the second position P2, and the second urging surface 124 is substantially in succession to the first urging surface 122. Particularly, the second urging surface 124 is in parallel with the moving path L1 of the urging portion 134, and a step 126 exists in the second urging surface 124 with respect to the first urging surface 122.

Accordingly, when the user pushes the latching module 130 to move from the first position P1 towards the second position P2, the urging portion 134 first interferes with the first urging surface 122, and urges the battery 120 away from the casing 110 along the first urging surface 122. Once the urging portion 134 moves to the second urging surface 124, due to the existence of the step 126, the urging portion 134 cannot resume its original position on the first urging surface 122. At this time, the urging portion 134 can only rest on the second urging surface 124. The battery 120 is, as shown in FIG. 5, urged by the urging portion 134 along a moving path L3 away from the outer surface S2 of the casing 110, such that it is convenient for the user to take the battery 120 from the outer surface S2 of the casing 110.

Next, referring to FIG. 3B, FIG. 3C, FIG. 4D, and FIG. 4E, when the battery 120 is taken out and the user releases the force applied on the handle 140 for driving the latching module 130, the elastic member 150 exerts an elastic force to drive the latching module 130 to move from the second position P2 towards the first position P1. It should be noted that, the first stopping portion 112 of the casing 110 is located in a moving path L2 of the second stopping portion 136 of the latching module 130, that is, the first stopping portion 112 interferes with the second stopping portion 136, and the latching module 130 stops at a third position P3, that is, the latching module 130 fails to return to the first position P1.

In this embodiment, the second stopping portion 136 has an elastic arm 136a extending from the main body 132 and a protrusion 136b connected to the elastic arm 136a and facing the first stopping portion 112. In other words, due to the elasticity of the elastic arm 136a, when the user drives the latching module 130 to move from the first position P1 to the second position P2, the second stopping portion 136 may easily pass by the first stopping portion 112, and when the elastic member 150 drives the latching module 130 to move from the second position P2 back to the first position P1, the protrusion 136b interferes with the first stopping portion 112 to resist the elastic force of the elastic member 150, so as to prevent the latching module 130 from continuously moving towards the first position P1.

Since the first stopping portion 112 interferes with the second stopping portion 136, and the latching module 130 stops at the third position P3, the first stopping portion 112 absorbs a part of the elastic force of the elastic member 150, such that when the user intends to load the battery 120 back into the casing 110, the user only needs to resist a part of the elastic force to assemble the battery 120 back to the casing 110.

Figure 4D:
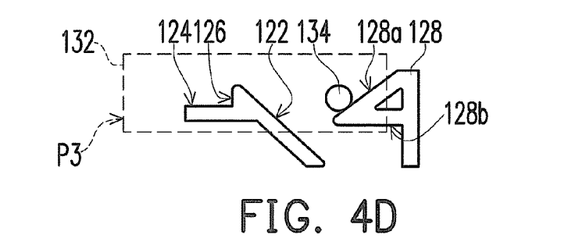
Figure 4E:
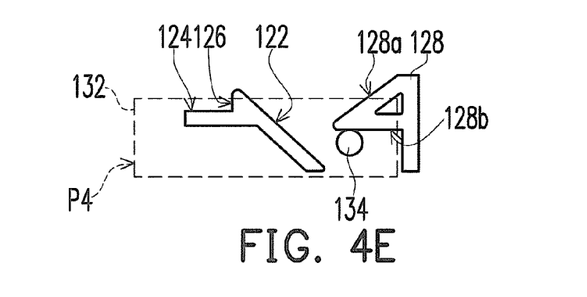
Figure 5:
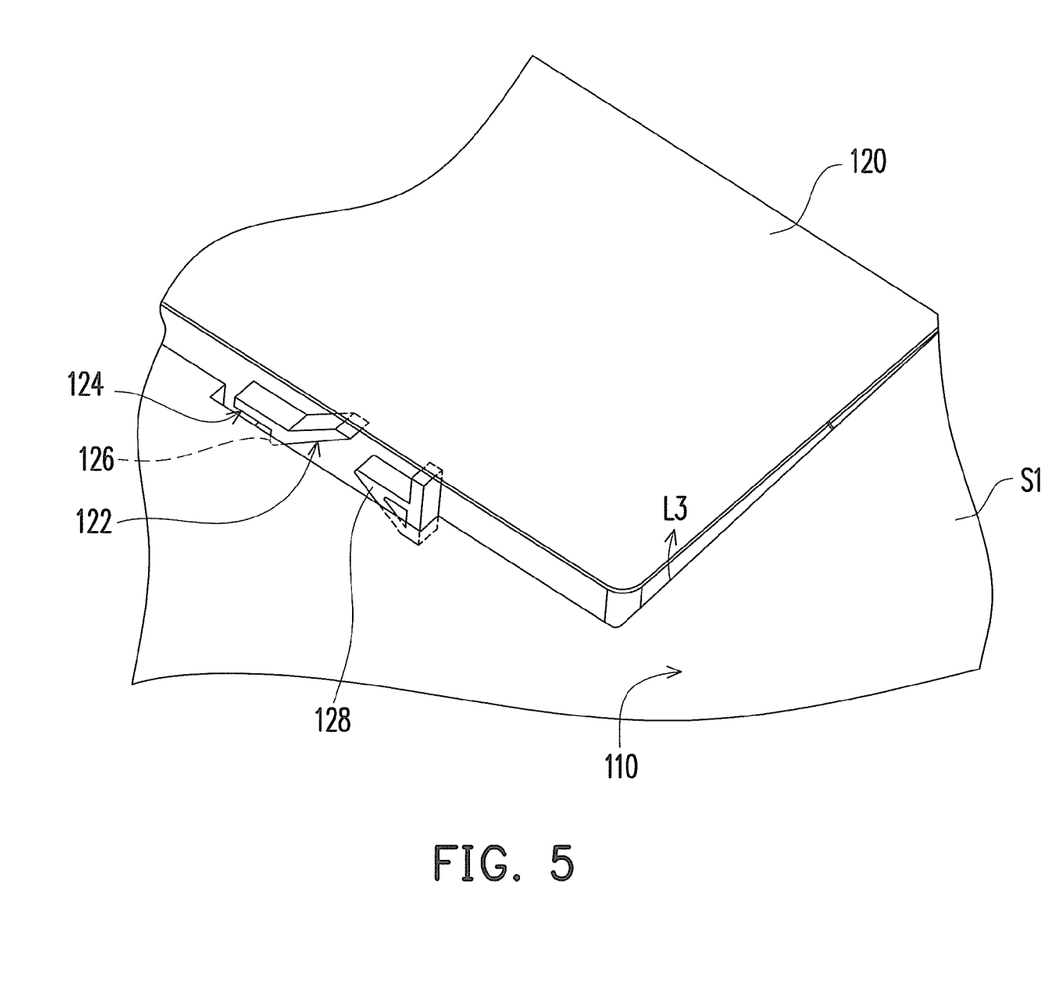
FIG. 5 is a partial enlarged view of the electronic device in FIG. 4C at another viewing angle.

Further, as shown in FIG. 4D and FIG. 4E, the battery 120 also has a hook 128, so that in this embodiment, the hook 128, the first urging surface 122, the step 126, and the second urging surface 124 are sequentially located in the moving path L1 of the urging portion 134. The hook 128 has a third urging surface 128a and a buckling surface 128b, the third urging surface 128a forms an acute angle with the moving path L1 of the urging portion 134, and the buckling surface 128b is in parallel with the moving path L1 of the urging portion 134. When the latching module 130 moves from the first position P1 towards the second position P2, the urging portion 134 correspondingly moves from the original position buckled to the buckling surface 128b towards the first urging surface 122. When the battery 120 is unloaded and the elastic member 150 drives the latching module 130 to move to the third position P3, and before the battery 120 is assembled back to the casing 110, the urging portion 134 is substantially located on the third urging surface 128a. When the user assembles the battery 120 back to the casing 110 in a direction opposite to the moving path L3, the user applies a force to make the urging portion 134 move from the third urging surface 128a to a fourth position P4 on the buckling surface 128b. At this time, the battery is retained by the latching module 130 through the hook 128, and the battery 120 may not fall from the casing 110. Particularly, as the route of the latching module 130 moving from the first position P1 to the third position P3 is half of the route of the latching module 130 moving from the first position P1 to the second position P2, so that the user does not need to completely resist the elastic force of the elastic member 150, that is, the user does not need to re-apply a force to make the urging portion 134 of the latching module 130 move across the third urging surface 128a and the buckling surface 128b of the hook 128 after the elastic member 150 forces the latching module 130 to return to the first position P1. As such, it is convenient for the user to buckle the battery 120 to the latching module 130.

In another aspect, the user may further push the battery 120 in a direction appsoite to the third path, and thus the latching module 130 is enabled to move from the fourth position P4 back to the first position P1 (as shown in FIG. 4E and FIG. 4A), so that the battery 120 can be completely closed to the outer surface S2 of the casing 110. Thereby, the battery 120 has a consistent profile with the outer surface S2 of the casing 110, and the electronic device 100 has a better appearance.

In view of the above, according to the embodiments of the present invention, through the structural cooperation between the latching module and the casing, and since the battery has the hook, the first urging surface, the step, and the second urging surface sequentially located in the moving path of the urging portion of the latching module, the user is enabled to conveniently push the latching module to move from the first position to the second position, so as to urge the battery away from the casing and detach the same. Moreover, the latching module, after unloading the battery, stops at the third position between the first position and the second position due to the cooperation of the first stopping portion and the second stopping portion, instead of returning to the original first position. In this manner, the user may apply a small force to make the battery buckled to the outer surface of the casing when loading the battery the next time, and the electronic device can be operated conveniently by using a few components.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An electronic device, comprising:
a casing, comprising an accommodation space and a first stopping portion located in the casing;
a battery, detachably assembled in the accommodation space, wherein the battery comprises a hook extending towards the casing, a first urging surface, a second urging surface, and a step connected between the first urging surface and the second urging surface; and
a latching module, disposed in the casing and moving back and forth between a first position and a second position, the latching module comprising:
a main body;
an urging portion, extending from the main body towards the battery;
a second stopping portion, wherein the first stopping portion is located in a moving path of the second stopping portion; and
an elastic member, disposed in the casing, wherein the elastic member is connected between the main body and the casing, the latching modules moves from the second position towards the first position through the elastic member, and the first stopping portion stops the second stopping portion at a third position, wherein the thrid position is between the first position and the second position,
wherein when the latching module moves from the first position towards the second position, the hook, the first urging surface, the step, and the second urging surface are sequentially located in a moving path of the urging portion; when the latching module is located at the first position, the urging portion is buckled to the hook; and when the latching module is located at the second position, the urging portion is limited by the step and rests on the second urging surface.

2. The electronic device according to claim 1, wherein the first urging surface forms an acute angle with the moving path of the urging portion.

3. The electronic device according to claim 1, wherein the second urging surface is in parallel with the moving path of the urging portion.

4. The electronic device according to claim 1, wherein the third position is at a midpoint between the first position and the second position.

5. The electronic device according to claim 1, wherein the hook comprises a third urging surface and a buckling surface, when the latching module is located at the third position, the urging portion rests on the second urging surface, and when the latching module is located between the first position and the third position, the urging portion rests on the buckling surface.

6. The electronic device according to claim 5, wherein the third urging surface forms an acute angle with the moving path of the urging portion, and the buckling surface is in parallel with the moving path of the urging portion.

7. The electronic device according to claim 1, wherein the second stopping portion comprises an elastic arm extending from the main body and a protrusion connected to the elastic arm and facing the first stopping portion.

8. The electronic device according to claim 1, further comprising:
    a handle, movably disposed on an outer surface of the casing, wherein the handle comprises an embedded portion, penetrating the casing and embedded in the main body.

\* \* \* \* \*